Aug. 31, 1965 S. E. CLARKE 3,203,022
VACUUM CLEANER FOR LAWNS
Filed Jan. 13, 1964 3 Sheets-Sheet 1
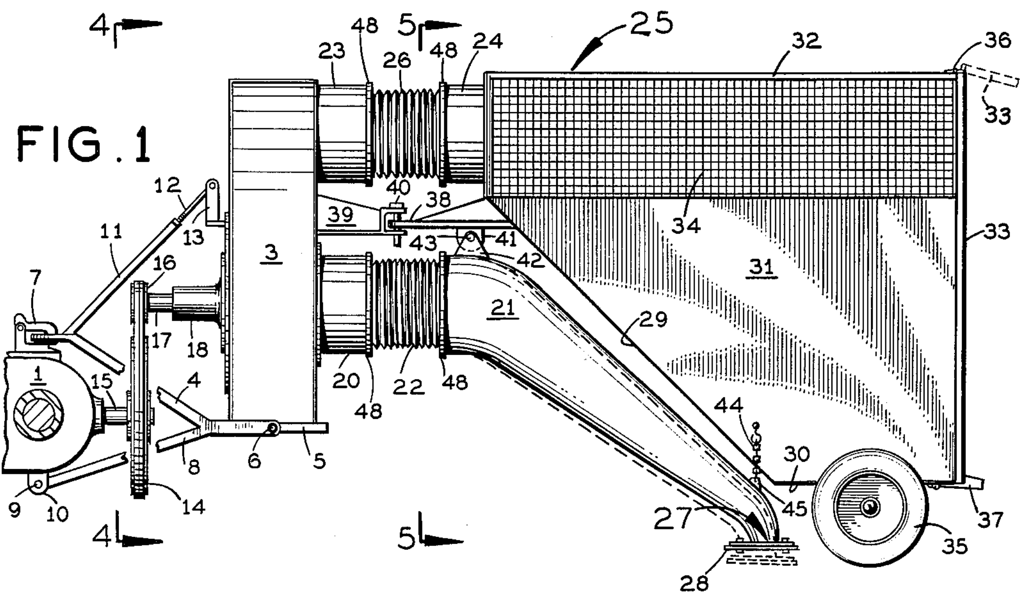
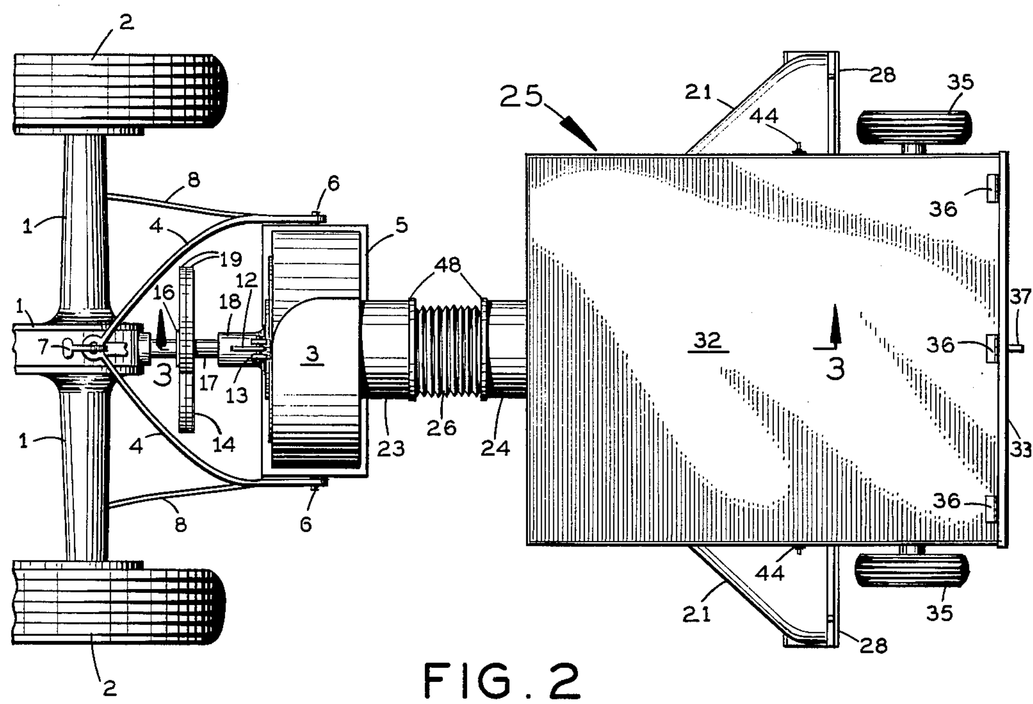
INVENTOR.
STANLEY E. CLARKE
BY Lloyd J Andrews VACUUM CLEANER FOR LAWNS
Filed Jan. 13, 1964 3 Sheets-Sheet 2
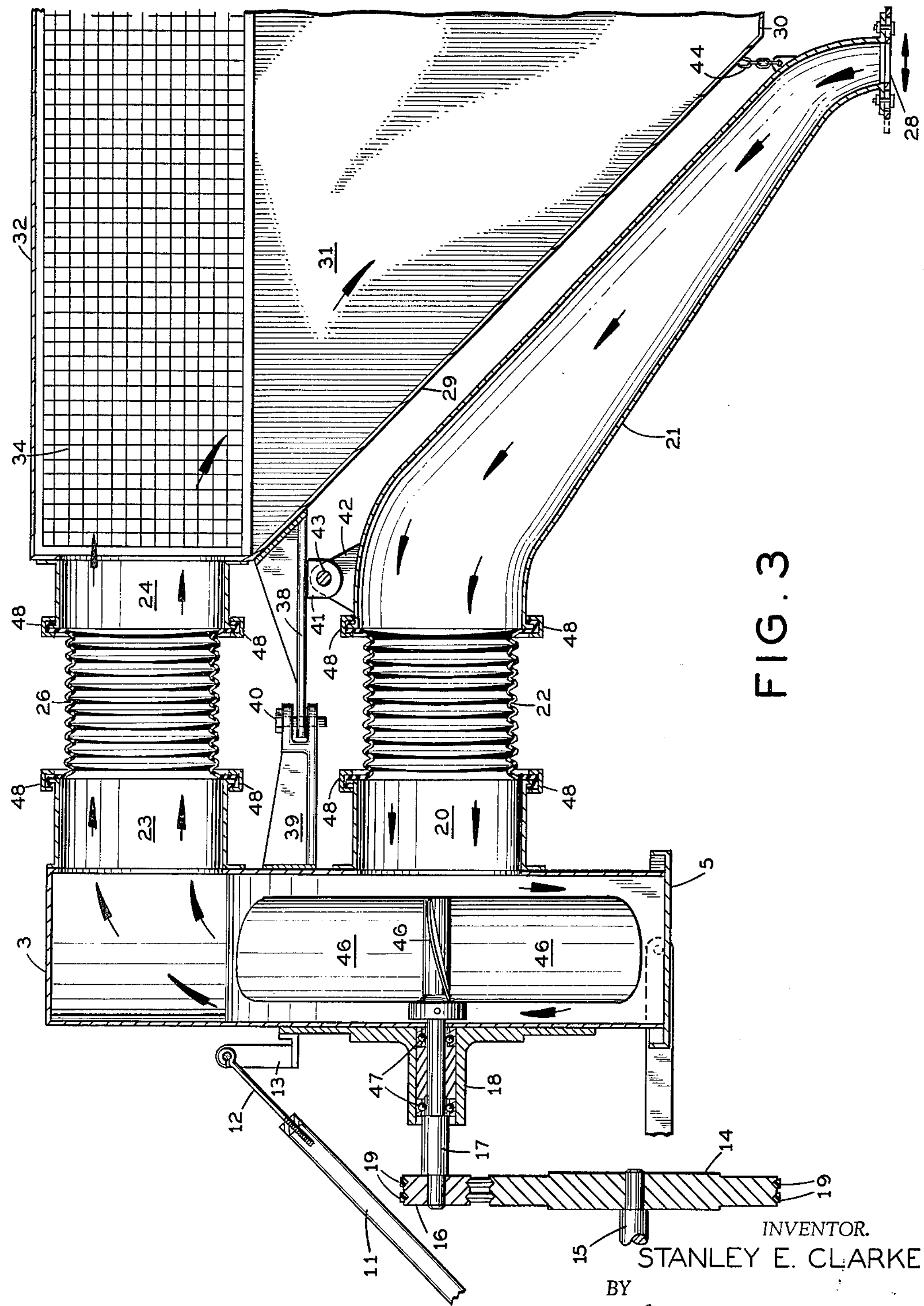

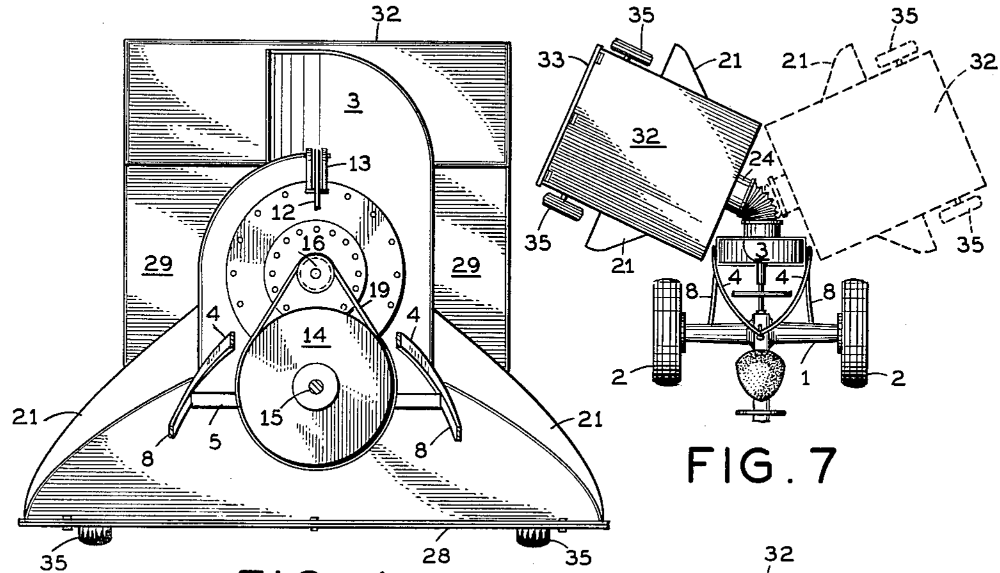
FIG. 4
FIG. 7
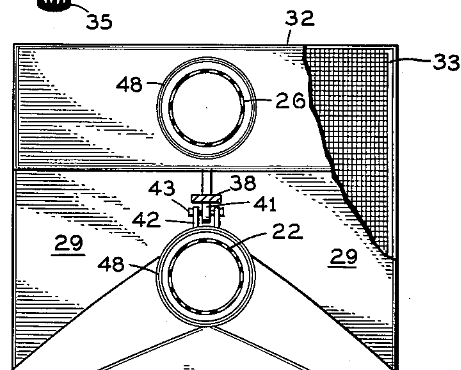
FIG. 5
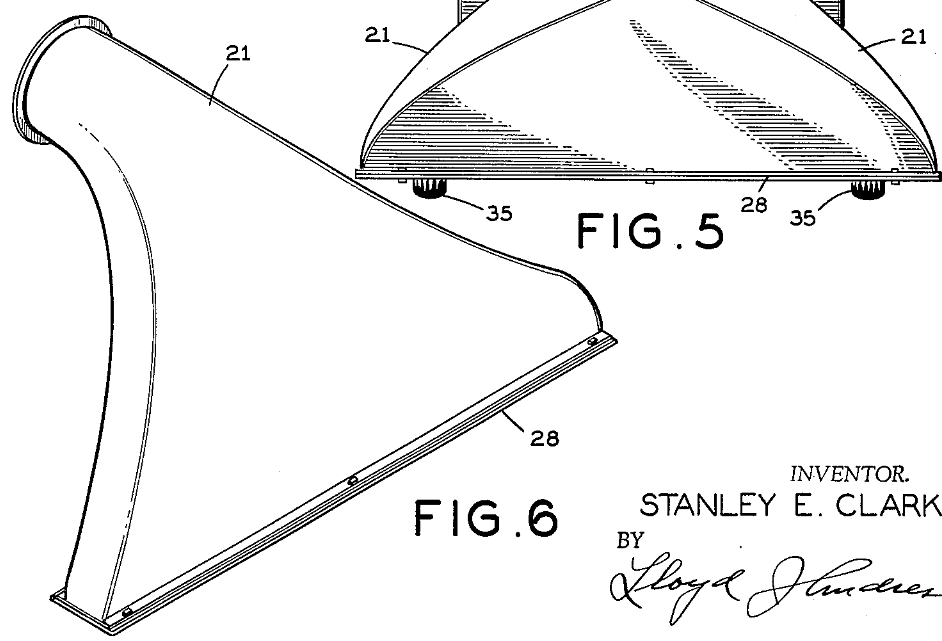
FIG. 6
INVENTOR.
STANLEY E. CLARKE
BY
Lloyd J Andres 3,203,022

VACUUM CLEANER FOR LAWNS

Stanley E. Clarke, 776 W. 54th St., Miami Beach, Fla.

Filed Jan. 13, 1964, Ser. No. 337,231
4 Claims. (Cl. 15—340)

This invention relates in general to vacuum cleaners and more particularly to a mobile suction machine adapted to be transported and powered by a conventional tractor.

The problem of power cleaning large lawns, such as parks, golf courses and the greens thereof, has long been a problem in that prior vacuum devices maintained the suction nozzle in contact with the surface of the earth and hence did violence to the grass and because of the usual large turning radius required for prior machines of this type, many lawn areas required cleaning by manual means.

Prior machines also included limitations in the means for retaining the collected material which usually consisted of a bag requiring frequent emptying or unwieldy containers which required considerable manual effort to unload.

The present invention overcomes the above objections and disadvantages by the provision of a relatively low cost attachment for connection to a conventional tractor having rubber tired wheels and a rear power take-off for driving a centrifugal blower having the suction port thereof connected to a nozzle which may be adjustably positioned a predetermined distance above the surface of the earth for effectively cleaning the grass thereon and having a secondary action for restoring trampled grass in a desirable generally vertical position, which features are principal objects of the invention.

Another object of the invention is the provision of a vacuum cleaner attachment for a conventional tractor with a centrifugal blower attachment to the rear of the tractor and adapted to be driven by power take-off including a material receiving hopper connected by a pair of rubber tire wheels and pivotally connected to the outlet of the blower with the suction nozzle floatingly supported a predetermined distance above the surface of the earth and flexibly connected to the inlet of the blower.

A further object of the invention is the provision of a blower attachment trailer means for a tractor in which the inlet and outlet thereof are flexibly connected to a trailer portion comprising a hopper means for retaining collected material and a suction nozzle floatingly attached to said hopper for the vacuum collection of the material with means coupling said hopper and said suction nozzle to said blower for relatively small turning radius.

These and other objects in one embodiment of the invention, are described and shown in the following specification and drawings, in which:

FIG. 1 is a side elevation of the vacuum cleaner in reduced scale.

FIG. 2 is a top plan view of the cleaner shown in FIG. 1.

FIG. 3 is an enlarged cross sectional side view taken through section line 3—3, FIG. 2.

FIG. 4 is a cross sectional front end view taken through section line 4—4, FIG. 1.

FIG. 5 is a cross sectional end elevation taken through section line 5—5, FIG. 1.

FIG. 6 is a perspective view of the vacuum nozzle, shown in FIGS. 1 and 3.

FIG. 7 is a top plan view in reduced scale illustrating changed positions, not shown.

Referring to FIGS. 1 and 2, the forward end of the vacuum cleaner is attached to a rear axle 1 of a conventional tractor preferably having pneumatic rubber tired traction wheels 2—2. A casing 3 of a centrifugal blower is secured to axle 1 by an upper wishbone bracket 4—4, pivoted to the base 5 of the blower casing on studs 6—6. The common junction of the wishbone 4—4 is secured to the upper side of the axle 1 by a manual releasable latch means 7 and the wishbone is further reinforced by lateral struts 8—8 secured thereto and detachably retained by pins 9—9 in clevis 10—10 on the lower side of axle 1, as shown. The blower casing is further braced by a strut 11 secured to the junction of the wishbone members 4 and by an adjustable eye bolt 12 retained in a clevis 13 secured to the front side of the blower casing 3. Thus the blower is adjusted for rigid attachment to the rear axle of the tractor as shown; however, the blower is detachable by manipulating latch 7 and removing pins 9—9.

A drive pulley 14 is secured by well known means to power takeoff shaft 15 of the tractor and is aligned with a driven pulley 16 attached to the drive shaft 17 of the blower which shaft is journalled in bearing housing 18, as shown. A pair of endless V belts 19 are engaged with pulleys 14 and 16 when the takeoff shaft 15 is rotated.

A cylindrical intake manifold 20 of the blower is connected to the cylindrical outlet of the nozzle member 21 by an accordion type flexible tube 22. The cylindrical outlet manifold 23 of the blower is connected to a cylindrical inlet 24 of the receiving hopper 25 by an accordion type flexible tube 26.

The vacuum nozzle 21 terminates at its lower end in an elognated narrow linear orifice 27 having a lateral span substantially equal to the tread of the tractor wheels. A blade 28 also having an elongated orifice therein is adjustably secured to the lower end of the nozzle for the purpose of adjusting the width of the orifice for the purpose of increasing or decreasing the velocity of air movement into the nozzle which will be hereinafter described.

Referring to FIGS. 1 and 2, a hopper 25 comprises a frame not shown with the lower sides 29 and 30 and like opposite sides 31 and the top side 32 made of sheet metal. The rear door 33 and the like upper sides 34 of the hopper are covered with screen for retaining the sweepings but permitting the free flow of air therethrough. The hopper is adapted for mobility on the surface of the lawn by a pair of rubber tired wheels 35 secured to the hopper by an axle, not shown.

The rear door 33 is pivoted along its upper edge on a hinge means 36 and normally retained in closed position by a manual latch 37. A draw bar 38 is fixed to the frame of the hopper 25 in position as shown and is pivotally engaged with a clevis member 39 secured to the casing 3 of the blower by a clevis pin 40 which is positioned with its vertical axis in substantially central relation to tubes 22 and 26. A tongue 41 fixed to and depending from drawbar 38 is engaged between a clevis 42, as shown, integral with nozzle 21 which is supported by a bolt 43 therethrough. The lower end of the nozzle 21 is floatingly supported a predetermined distance above the surface of the earth to be vacuum cleaned by chains 44 adjustably secured to opposite sides of the hopper 31 and engaged with corresponding eyes 45 on the hopper 21, as shown.

Referring to FIG. 3, the blower impeller 46 is secured to drive shaft 17 which is journalled on ball bearings 47 as shown and the inlet and outlet tubes 22 and 26 are secured in the positions shown by circular channel bands 48 by contracting screw means, not shown.

In operation and under the assumption that the vacuum cleaner device is attached to the tractor, as shown in FIGS. 2 and 3, and the nozzle 21 is adjusted for predetermined clearance between the blade 28 and the surface of the lawn and with a predetermined width of orifice 27 in the nozzle, then the cleaner is ready for mobile use.

When the tractor is running and the take-off shaft 15 is driven, the rotation of the blower will cause a relatively high velocity traverse of air into the orifice 27 which will move through the blower and be exhausted through the manifold 23 into the hopper 25. Thus, as the tractor is driven over the surface of the lawn and trailed by the hopper wheels 35, grass cuttings and other debris will enter the orifice 27 and pass through the blower and be deposited into the hopper 25 with the excess flow of air escaping through the screen 34 on the sides and the rear door of the hopper.

The adjustable suspension of the orifice of the nozzle predetermined distances above the surface of the lawn provide means whereby the suction of air into the orifice will straighten bent and trampled grass and grass matted by the tractor wheels into a relatively vertical position and thus preserve the appearance and life of the lawn.

It is apparent that the blower assembly is secured substantially rigid to the rear axle of the tractor and the draw bar 38 of the hopper is pivoted for lateral and vertical tilting movement about clevis pin 40 which is retained by member 39, secured to the blower casing, therefore, it is apparent that when the tractor is steered into a relatively sharp turn, the hopper and nozzle may pivot about pin 40 in an angle as much as in the order of 60 degrees in each lateral direction by virtue of the flexibility of the tubes 22 and 26, as illustrated in FIG. 7.

Because of the clearance between the pin 40 and the draw bar 38 and because of the vertical pivotal action of the nozzle 21 about the horizontal axis of bolt 43, the tractor and the trailing cleaning attachment will successfully traverse reasonable hill and dale contour in the lawn being cleaned. Therefore, it can be seen that the high degree of maneuverability of the vacuum cleaner is practical for cleaning restricted lawn areas. It has been found that for cleaning short cropped lawns, such as golf course greens, the blade of the nozzle is best adjusted close to the surface of the lawn with the orifice adjusted to a relatively wide opening for a relatively low velocity of incoming air; whereas, long cut grass, such as golf course fairways, are best cleaned with a greater distance adjustment between lawn and blade and with a restricted orifice adjustment, which results in a relatively high velocity air intake.

The cleaning residue retained in the hopper is easily unloaded by backing the hopper into a desired position and opening the rear door and simply urging the residue therefrom by rake or similar manual device. The discharge of the residue may also be aided by placing the tractor in neutral and operating the blower only.

Certain modifications in the above construction, utilizing the features described, are intended to come within the scope of the appended claims.

Having described my invention, I claim:

1. A vacuum cleaner for lawns comprising a tractor having a power take-off shaft, a centrifugal blower rigidly secured to the rear end of said tractor including a drive shaft extending therefrom, said blower having the inlet and outlet means thereof positioned in vertical parallel spaced relation and centrally positioned with respect to said tractor and facing rearward therefrom with the said outlet means uppermost, a transmission means connecting said take-off shaft and said drive shaft for rotating said blower when said take-off shaft is rotated, a hopper means having a pair of independently journalled transversely positioned wheels on the bottom side thereof for rotation on a common axis for supporting said hopper for travel over a lawn, a foraminated door on the rear side of said hopper and an inlet orifice means on the front side thereof positioned in spaced coaxial relation to the said outlet means of said blower, a pivotal draw bar means connecting said blower and said hopper centrally positioned with respect to said tractor and adapted to permit lateral and angular vertical movement of said hopper with respect to said tractor, a suction nozzle means floatingly and adjustably secured to the underside of said hopper means and forward of said wheels including a linear suction orifice extending in transverse relation with respect to hopper means and in predetermined spacing from said lawn, said nozzle having an outlet orifice positioned in spaced and coaxial relation with said inlet means of said blower, a flexible conduit connecting said outlet means to the said inlet orifice of said hopper and a like conduit connecting said inlet means to said outlet orifice of said nozzle whereby the inrush of air into the said suction orifice will carry therewith grass cuttings and other debris through said nozzle and blower and deposit same into said hopper when said tractor is operated and said vacuum cleaner is moved in both straight and curved paths on a lawn.

2. A vacuum cleaner attachment for a tractor for cleaning and restoring matted grass of a lawn having a power take-off shaft comprising a centrifugal blower and including bracket means for rigidly and adjustably securing same to the rear axle of said tractor, said blower having an inlet and outlet orifice facing rearward with respect to said tractor, a transmission means connecting said take-off shaft and said blower means for operating the latter when said shaft is rotated, a mobile hopper means including a draw bar connection means for pivotally securing said hopper to said blower for trailing travel in the path of said tractor when the latter is operated and traveling on a lawn, said hopper having a forward facing inlet orifice and a foraminated outlet, a suction nozzle having a forward facing outlet floatingly secured under the forward portion of said hopper means including a linear suction orifice means positioned lateral said path and constructed and adapted for uniform spaced relation to the surface of said lawn, a flexible conduit having opposite ends thereof connected to said blower outlet and said hopper inlet respectively, a second flexible conduit connecting said blower inlet to said nozzle outlet respectively whereby the said blower will induce cut grass and debris into said suction nozzle and through said blower into said hopper means from said lawn and straighten matted grass thereon when said tractor is driven over said lawn and said take-off shaft is operated.

3. In a vacuum cleaner attachment for a tractor of the character described a centrifugal blower including attachment means for securing said blower to said tractor, said blower having independent inlet and outlet orifices, a transmission means associated with said tractor and said blower for driving the latter when the said tractor is operated, a hopper means having foraminated openings there in for receiving and retaining debris conveyed therein by air moving therethrough including a forward facing inlet orifice, said hopper supported by mobile wheels and hitched to said blower by pivotal draw bar means secured to said hopper, a nozzle having a linear suction orifice positioned transverse the path of movement of said tractor and floatingly suspended by said hopper means a uniform predetermined distance above the surface of said lawn, said nozzle having a forward facing outlet orifice, a flexible conduit connecting the said inlet orifice of said blower to said outlet orifice of said nozzle and a second flexible conduit connecting said blower outlet orifice to said hopper inlet orifice whereby the debris on said lawn will be induced into said suction orifice through said blower and be deposited in said hopper when said tractor is operated.

4. The construction recited in claim 3 including a plate having a linear slot therein of predetermined width adjustably secured to said nozzle over said suction orifice whereby the adjustment of said plate will adjust the width of the effective orifice to a predetermined dimension for controlling the velocity of air induced therethrough.

References Cited by the Examiner

UNITED STATES PATENTS

| | | | |
|---|---|---|---|
| 514,676 | 2/94 | Furnas | 15—340 X |
| 514,678 | 2/94 | Furnas | 15—340 |
| 1,211,902 | 1/17 | Warner | 15—340 |
| 2,131,398 | 9/38 | Hubbart | 15—340 X |
| 2,496,028 | 1/50 | Wells | 15—340 |
| 3,087,187 | 4/63 | Hank et al. | 15—340 |

FOREIGN PATENTS

| | | |
|---|---|---|
| 17,433 | 1901 | Great Britain. |

WALTER A. SCHEEL, *Primary Examiner*.